May 15, 1928. 1,669,931
C. F. DOWRIE
SHAFT COUPLING
Filed May 22, 1926
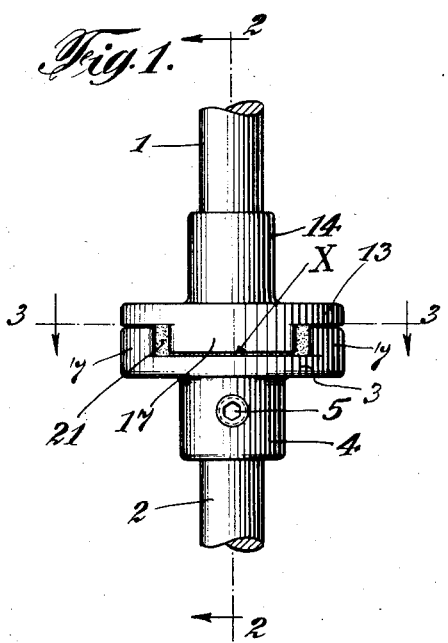
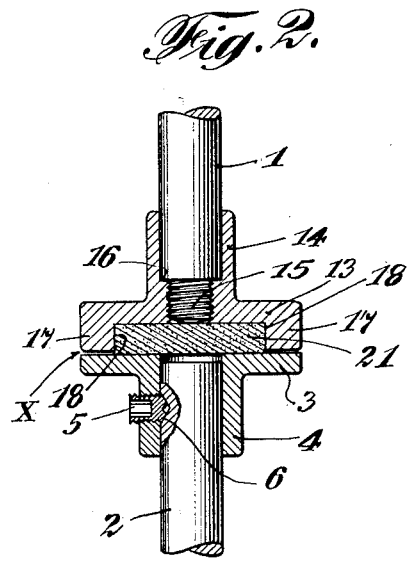
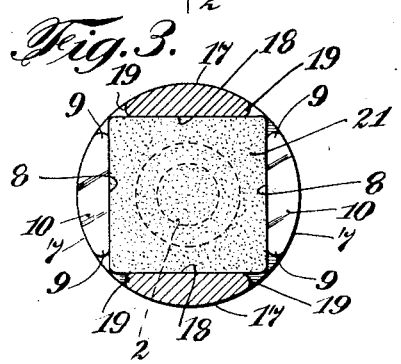
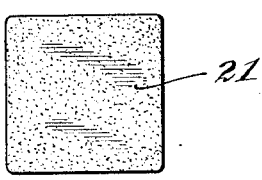
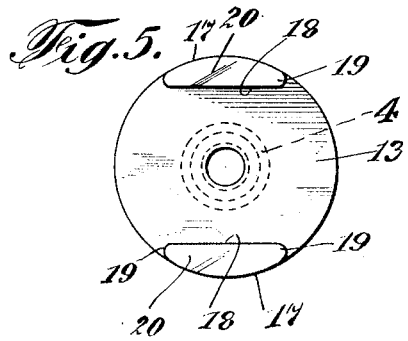
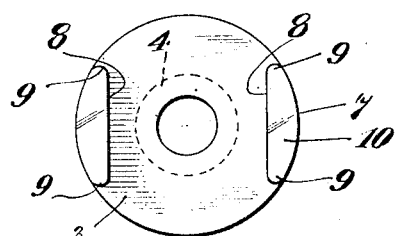
INVENTOR
Charles F. Dowrie
By George C. Dean
his ATTORNEY Patented May 15, 1928.

1,669,931

UNITED STATES PATENT OFFICE.

CHARLES F. DOWRIE, OF DETROIT, MICHIGAN, ASSIGNOR TO SILENT AUTOMATIC CORPORATION, A CORPORATION OF MICHIGAN.

SHAFT COUPLING.

Application filed May 22, 1926. Serial No. 110,898.

My present invention is shown as a device primarily intended for coupling the armature shaft of a high speed electric motor to the shaft of a rotor to be directly driven thereby but, as will be explained, the various novel features of the coupling adapt it for other uses.

The present embodiment of my invention combines the following advantages:

The driving torque is transmitted circumferentially through an elastic medium, preferably leather, and preferably without contact of metal of the driving member with metal of the driven member, either circumferentially or endwise of the shafts. Preferably, there are no endwise interlocking parts, the coupling members being therefore freely removable endwise of the shaft, their engagement being assured only by endwise positioning of the driving and driven shafts and said positioning need be neither very powerful nor very positive because the formation of parts is such that driving stress has no endwise component tending to uncouple the interengaging parts.

The above features are combined in an extremely simple construction, which is, first, a cushioning means minimizing transmission of vibration or hum of the motor to the driven shaft, or vice versa, and second, is within limits a universal joint permitting considerable angular misalignment and also lateral misalignment without any commensurate strain on the driving or driven shafts or on the coupling members.

The above and other features of my invention will be more evident from the following description in connection with the accompanying drawings, in which:

Fig. 1 is a side elevation of the shafts and couplings in their preferred position of vertical alignment;

Fig. 2 is a section on the line 2—2, Fig. 1;

Fig. 3 is a section on the line 3—3, Fig. 1; and

Figs. 4, 5 and 6 are detail views of the three elements which are assembled to constitute the couplings shown in the other figures.

In these drawings the shaft 1 may be assumed to be a driven shaft rotating in suitable bearings not shown, preferably in the vertical position which is shown. The other shaft, 2, may be assumed to be the armature shaft of the high speed electric motor which it is desired to apply in or remove from driving relation with the shaft 1.

A simple coupling disc, 3, having a hub, 4, is secured to shaft 2 by a locking screw, 5, engaging the usual key recess, 6. The face of this disc is provided at the periphery with axially extending dogs, 7, 7, which, as shown in Figs. 3 and 6, have faces, 8, parallel with each other and with the axis of the shaft, these faces being rounded off at both ends, 9, as shown. Their upper faces are parallel with the face of disc 3, being in a plane of rotation which is at right angles to the axis of the shaft.

The other coupling member comprises a similar disc, 13, having similar upstanding dogs, 17, their opposite parallel faces, 18, 18, rounded ends, 19, 19, and radial tops, 20, corresponding respectively with 8, 9 and 10 of the other coupling. This disc, 13, may have its hub, 14, secured to shaft 1 by screw-threaded engagement with reduced screw-threaded extension, 15, whereby the shoulder 16 may be drawn into locking engagement with a corresponding shoulder in the hub.

In operative position, the dog, 7, of the motor shaft coupling member and the corresponding dogs of the other coupling member are intermeshed endwise but are prevented from engagement by a square block, 21, of proper size to fit the pair of faces, 8, 8, and also the pair of faces, 18, 18, when they are exactly 90° from each other circumferentially. The corners of this block protrude radially between the ends 9 of the driving dogs and the adjacent ends 19 of the driven dogs.

Even when the block 21 is of metal or other incompressible material, this arrangement will permit of considerable lateral displacement of one shaft out of line with the other, as also a certain amount of angular misalignment, because the block 21 can slide freely between the surfaces 8 in one direction and also between the surfaces 18, while still fitting all of said surfaces. In connection with angular misalignment, it may be seen from Fig. 2 that the endwise clearance at $x$ will permit of considerable rocking upon the block 21 as a fulcrum before the faces 10, 20 of the dogs can come in contact with the faces of the discs 3 and 13.

The above explanation of possible operation, where the block 21 is of metal, is of interest mainly as showing the correctness of the mechanical relations for misalignment even though the parts be rigid, a highly important feature of the invention being the use of leather or other durable material of considerable elasticity but limited compressibility. When such a block is of sufficient thickness to project slightly beyond the faces of the lugs, it forms an endwise cushion as against vibration, while the corners of the square form torque cushions for cushioning circumferential vibration as well as preventing driving engagement between metal and metal.

From the above, it will be seen that I have provided a simple 3-part coupling, consisting of a block having parallel faces, whereby it constitutes an endwise cushion between the ends of the shafts, while its edges are square, so as to fit against corresponding pairs of faces of the driving dogs of the respective members with the corners of the square projecting radially between the ends of the dogs so that driving torque subjects the corners of the square to compression, and the entire block to distortion, the elasticity of the coupling being proportional to the elasticity of the block with respect to such distortions.

While I have shown the parts proportioned so that the block is a square inscribed in the circle of the discs and the dogs as segmental members, each but slightly less than a quadrant, it will be evident that the circumferential extent of the segments, as well as their radial thickness, may be varied considerably, with corresponding increase or decrease of the amount of material of the block intervening between the dogs at the corners; also that within limits the block may be an oblong instead of a square and provided the parallel pairs of engaging faces be preserved, a polygonal arrangement is possible.

While I have described at considerable length the flexibility of my coupling with respect to misalignment, it will be understood that in practice the shafts are aligned as perfectly as practicable and that all of the above features of universality and cushioning are directed to insuring frictionless, noiseless rotation at very high speed.

I claim:

1. A coupling, including two similar discs each having a pair of opposed, axially projecting lugs adapted to intermesh, with spaces between the lugs, in combination with an elastic block fitting between opposite lugs and projecting into the interspaces between them, the lugs of each pair having opposed parallel faces tangent to the same cylinder of rotation when their axes are in alignment and said elastic block having pairs of opposite parallel edges adapted to fit corresponding faces of said lugs.

2. A coupling, including two similar discs each having a pair of opposed, axially projecting lugs adapted to intermesh, with spaces between the lugs, in combination with an elastic block fitting between opposite lugs and projecting into the interspaces between them, the lugs of each pair having opposed parallel faces tangent to the same cylinder of rotation and said elastic block having pairs of opposite parallel edges adapted to fit corresponding faces of said lugs, said block being thicker than the axial length of the lugs to serve as spacer between said discs and prevent solid metal contact between the coupling members.

3. A cushioning coupling for shafts, including similar oppositely facing discs and a heavy block of elastic material fitting between the faces of said discs, said block being square at the edges and said discs having pairs of axially projecting lugs having inner faces fitting the sides of the square, with intervening spaces through which the corners thereof project.

4. A coupling comprising similar discs presenting opposite adjacent faces having pairs of opposite symmetrically located lugs projecting toward the opposite disc, the inner faces of said lugs corresponding to the outline of a parallelogram, with spaces intervening circumferentially between adjacent lugs of the opposite pairs, in combination with a parallel sided elastic block fitting said inner faces and having corners that project into said spaces between the lugs.

Signed at Detroit in the county of Wayne and State of Michigan this 20th day of April A. D. 1926.

CHARLES F. DOWRIE.